(12) United States Patent
Perdomo et al.

(10) Patent No.: US 7,001,453 B2
(45) Date of Patent: Feb. 21, 2006

(54) METHOD OF SELECTING A HIGH MODULUS LAYER BINDER

(75) Inventors: Dario Perdomo, Wichita, KS (US); Richard K. Steger, Wichita, KS (US); Joseph Drbohlav, III, Wichita, KS (US)

(73) Assignee: Koch Performance Roads, Inc., Wichita, KS (US)

( * ) Notice: Subject to any disclaimer, the term of this patent is extended or adjusted under 35 U.S.C. 154(b) by 174 days.

(21) Appl. No.: 10/784,106

(22) Filed: Feb. 20, 2004

(65) Prior Publication Data

US 2005/0183633 A1   Aug. 25, 2005

(51) Int. Cl.
*C09D 195/00*   (2006.01)
(52) U.S. Cl. .................. 106/273.1; 106/279; 106/280; 106/284.01; 524/59; 524/71
(58) Field of Classification Search ............. 106/273.1, 106/279, 280, 284.01; 524/59, 71
See application file for complete search history.

(56) References Cited

U.S. PATENT DOCUMENTS

| | | | |
|---|---|---|---|
| 6,113,681 A * | 9/2000 | Tripathi et al. ......... | 106/284.05 |
| 6,408,683 B1 * | 6/2002 | Bahia et al. ............... | 73/54.01 |
| 6,414,066 B1 | 7/2002 | Lem et al. | |
| 6,440,205 B1 * | 8/2002 | Bailey et al. ............... | 106/275 |
| 6,830,408 B1 * | 12/2004 | Blankenship et al. ......... | 404/17 |
| 2003/0075078 A1 | 4/2003 | Bailey et al. | |

OTHER PUBLICATIONS

"Superpave Asphalt Technology Program", Yildirim, Project Manager, The Superpave Asphalt Research Program, The University of Texas at Austin, 7 pages, 1996 (no month available).*

Corte, Jean-Francois, "Development and Uses of Hard-Grade Asphalt and of High-Modulus Asphalt Mixes in France", Transportation Research Circular 503: Perpetual Bituminous Pavements (Dec. 2001).

Nunn, M.E. and T. Smith, "Road Trials of High Modulus Base for Heavily Trafficked Roads", Transportation Research Laboratory Report 231 (1997).

* cited by examiner

*Primary Examiner*—David Brunsman
(74) *Attorney, Agent, or Firm*—Stinson Morrison Hecker LLP (57) ABSTRACT

A method of selecting an asphalt binder for use in constructing a high modulus layer of bituminous pavement is provided. This method includes measuring the complex shear modulus of one or more binders at a temperature of not more than about 30° C., measuring the creep stiffness of one or more binders at a temperature near the lowest in-service temperature at the depth of the layer at which the bituminous pavement is being placed, and selecting an asphalt binder for the high modulus layer using the complex shear modulus and creep stiffness measurements. A further aspect of the present invention is a method of formulating an asphalt binder that has a desirable complex shear modulus and creep stiffness for use in making the high modulus layer. This method of formulation includes mixing a stiff asphalt binder and a soft asphalt binder together to form a binder having a complex shear modulus of at least about 2 MPa at 30° C. and 10 rad/sec and a creep stiffness of no more than about 300 MPa when measured at a temperature of about 10° C. above the lowest in-service pavement temperature at 60 seconds loading time, on RTFO-aged material.

31 Claims, 6 Drawing Sheets

METHOD OF SELECTING A HIGH MODULUS LAYER BINDER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to constructing roads. More specifically, the present invention relates to a method of selecting an asphalt binder for use in constructing a high modulus layer of a roadway. Still further, the present invention involves formulating a binder for a roadway high modulus layer by mixing a stiff asphalt binder and a soft asphalt binder together.

The base layers of a roadway must be stiff enough to prevent high levels of bending or flexing under heavy traffic loads. They also must be able to properly distribute and spread the loads imparted to the substructure of a pavement system. One commonly employed method of controlling the amount of bending in the base layers and ensuring their capacity to distribute loads is to increase the overall thickness of the pavement structure. One disadvantage with such a method is that it can be very expensive. If thinner pavement cross-sections are made, costs can be reduced, but this typically will increase the flexing of the pavement structure and lead to rapid fatigue damage of the roadway when conventional materials are used.

Another way of creating a pavement layer with good properties is to select a desirable binder. Binders have been chosen that have a particular penetration value at a particular temperature, such as between 0 and 20 dmm at 25° C. However, relying solely on the penetration value of a binder does not adequately predict the performance of the pavement layer being created. More specifically, the penetration value by itself does not adequately capture both the stiffness requirements needed for maximizing bending stiffness and the minimum low temperature flexibility requirements needed so that thermal cracking does not become an overriding consideration.

Another methodology for selecting a binder is to measure its complex shear modulus at temperatures of about 50° C. and higher. The current industry-practice protocol for evaluating the performance of asphalt binders for resisting permanent deformation is the Strategic Highway Research Program (SHRP) Performance Grading (PG) Methodology (AASHTO M320 entitled Performance-Graded Asphalt Binder). In the SHRP PG protocol, the ability of a binder to resist permanent deformation is determined by measuring the temperature at which the unaged asphalt binder's complex shear modulus divided by the sine of the phase angle (G*/sin delta) is at least 1.0 kPa when measured at a frequency of 10 rad/sec. The phase angle and G* are measured beginning at approximately 52° C. and increasing in 6° C. increments therefrom. For example, an asphalt binder's phase angle and G* might be measured at 52° C., 58° C., and 64° C. If G*/sin delta for this binder is 2.75 kPa, 1.3 kPa, and 0.77 kPa at 52°C., 58° C., and 64° C., respectively, then the binder is classified as a PG-58 binder. This grading implies that the binder possesses a minimum required G*/sin delta to resist rutting at a pavement temperature of up to 58° C. One disadvantage with such a method is that it is not adequate for evaluating a high modulus layer binder because it does not sufficiently evaluate the contribution of the binder to help prevent excessive bending or flexing of the pavement at temperature ranges of interest.

Binders also have been selected using their ring and ball softening points. However, such data alone does not sufficiently predict whether the binder will adequately contribute to distributing the loads applied by heavy vehicles. In summary, the binder specification and formulation protocols of the prior art do not consistently provide pavement layers that meet desired pavement design requirements.

In order to overcome these disadvantages, a method of selecting an asphalt binder for a high modulus pavement layer that better predicts the ability of the binder to help minimize pavement bending or flexing is needed. A method of selecting a high modulus layer binder that better predicts the ability of the binder to distribute loads imparted to the substructure of the pavement system also is needed. Still further, a reproducible, reliable, and efficient method of formulating and testing high modulus layer asphalt binders is desired.

SUMMARY OF THE INVENTION

It is an object of the present invention to provide a method for selecting a binder for a pavement system high modulus layer that is stiff enough to prevent high levels of bending or flexing under heavy traffic loads and that significantly contributes to distributing and spreading the loads imparted to the pavement system substructure.

The foregoing and other objects are achieved by a method of selecting a high modulus layer asphalt binder that includes measuring the complex shear modulus of the binder at a temperature of not more than about 30° C., measuring the bending creep stiffness of the binder at a temperature near the lowest temperature at the depth at which the bituminous pavement is being placed, and selecting an asphalt binder for the high modulus layer using the complex shear modulus and creep stiffness measurements. A further aspect of the present invention is a method of formulating an asphalt binder that has a desirable complex shear modulus and creep stiffness. This method of formulation includes mixing a stiff asphalt binder and a soft asphalt binder together to form a binder having a complex shear modulus (G*) of at least about 2 MPa at 30° C. and 10 rad/sec and a creep stiffness of no more than about 300 MPa at 60 seconds loading time at a temperature approximately 10° C. warmer than the anticipated coldest in-service pavement temperature for the depth at which the binder is placed.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

In the accompanying figures, which form a part of the specification and are to be read in conjunction therewith.

DETAILED DESCRIPTION OF PREFERRED EMBODIMENT

The subsurface layers of a roadway are very critical to the long-term performance of the overall roadway structure, and the binder used in the subsurface layers of the pavement plays an important role in achieving the desired performance characteristics. The present invention includes an improved method of selecting an asphalt binder for use in constructing a high modulus layer of a roadway and an improved method of formulating an asphalt binder that will efficiently meet the novel selection criteria.

A high modulus pavement layer is a hot mix asphalt layer that is designed to be stiffer than those typically used in flexible pavement structures, and is engineered to spread or distribute loads to the pavement substructure effectively, and resist bending and permanent deformation under heavy traffic loads. A high modulus pavement layer preferably should have a resilient modulus ($M_r$) of at least about 5,000 MPa when measured at 30° C. according to AASHTO TP31-96, which is the Standard Test Method for Determining the Resilient Modulus of Bituminous Mixtures by Indirect Tension.

The binder selection method of the present invention includes measuring the complex shear modulus (G*) of one or more proposed asphalt binders at a temperature of no higher than about 30° C. Preferably, the complex shear modulus is measured at a temperature of at least about 10° C.

The temperature at which the complex shear modulus is measured is important because a series of asphalt binders that are rank ordered (highest to lowest) according to G* at a temperature of 50° C. or higher, as is the standard practice, might show a very different rank order when G* is evaluated at a temperature of no higher than about 30° C. This is because some asphalt binders build complex shear modulus much more rapidly than others as the temperature is lowered due to differences in chemical composition. Still further, another complicating factor is that certain additives, such as high molecular weight polymers, are added to asphalt binders in an attempt to dramatically increase the G* of the binder at relatively high temperatures, such as 50° C. and above. At these high temperatures, high molecular weight polymers can significantly increase the complex shear modulus of the base asphalt. However, at temperatures lower than 40° C., the impact of high molecular weight polymer on the binder's G* is negligible and in some cases even lowers G*, and the shear strength of the asphalt binder is determined almost entirely by the chemical composition of the asphalt itself.

Figure 1:
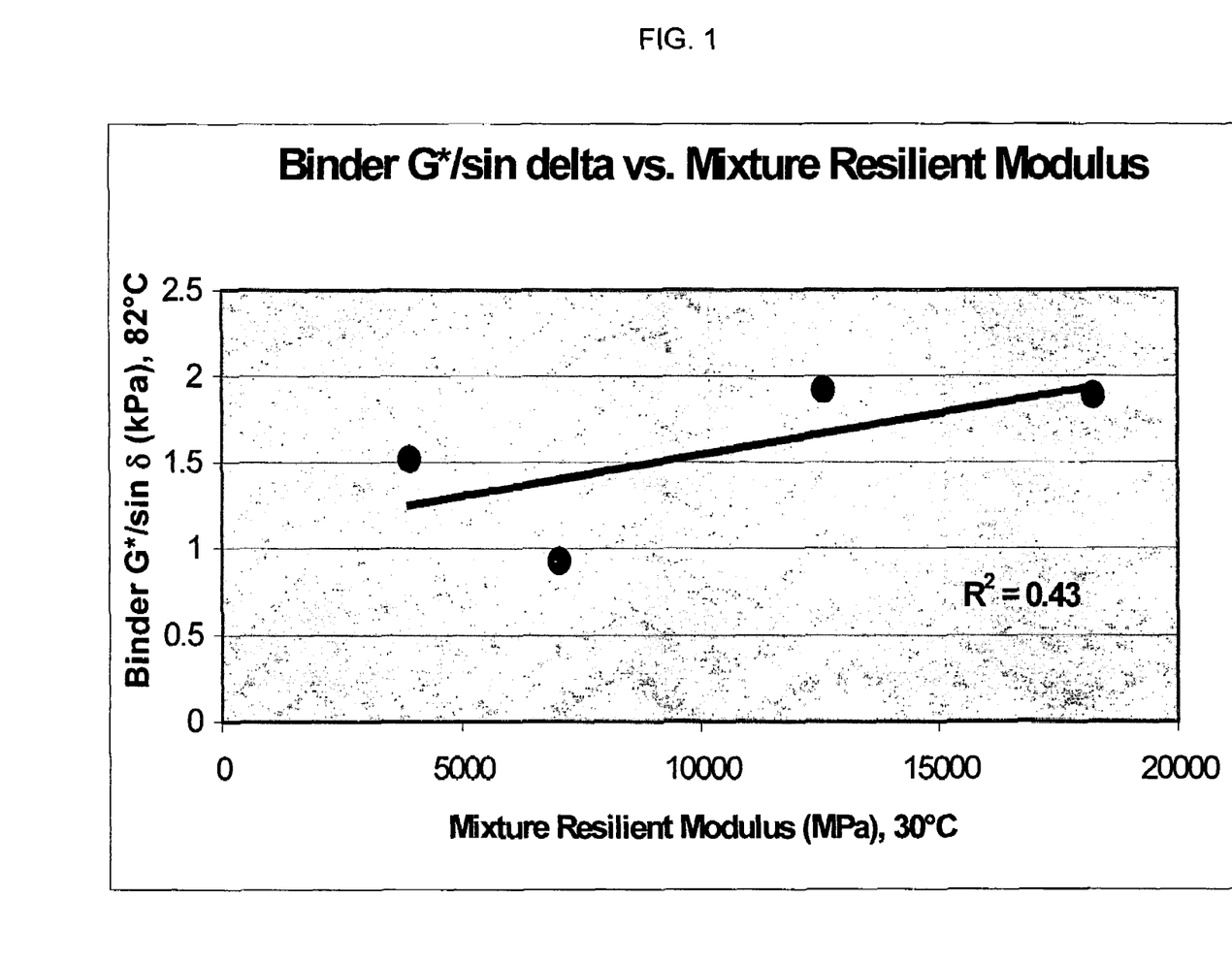
FIG. 1 is a graph showing binder G*/sin delta versus mixture resilient modulus of four binders each having a G*/sin delta value of at least 1.00 kPa at 82° C.

The lack of correlation between current binder testing protocol and the resilient modulus of an asphalt concrete high modulus layer made with a respective binder is shown in FIG. 1. Four binders were evaluated, each of which was formulated to meet the requirements for PG-82 under the current SHRP testing protocol, meaning that each of the binders had a G*/sin delta value of at least 1.00 kPa when tested at 82° C. FIG. 1 demonstrates that the use of the current SHRP testing protocol provides a poor correlation to the high modulus layer mixture resilient modulus at 30° C.

Figure 2:
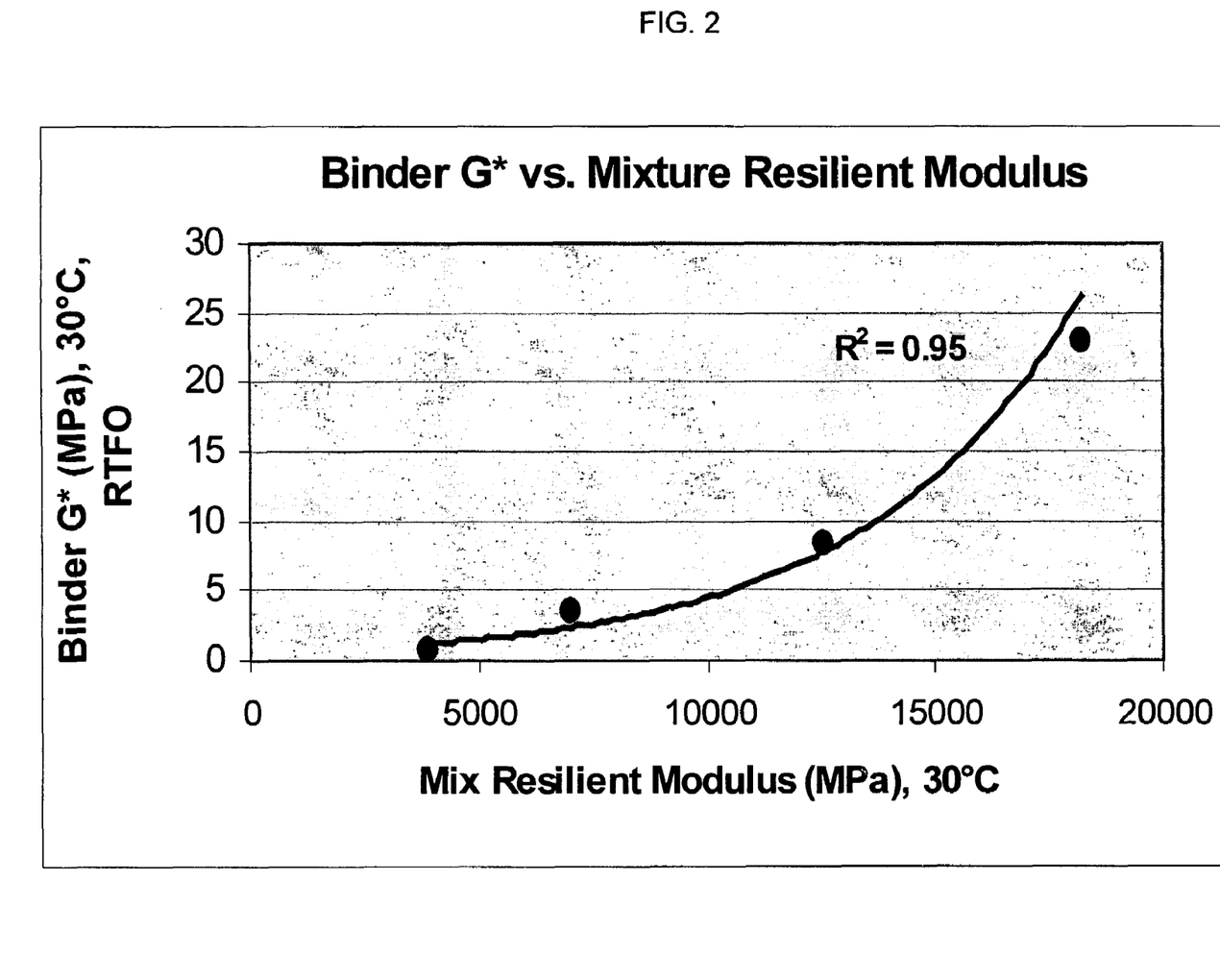
FIG. 2 is a graph showing the correlation between binder G* at 30° C. and mixture resilient modulus at 30° C. for four binders.

Preferably, the complex shear modulus of a Rolling Thin Film Oven (RTFO) aged binder is measured in a dynamic shear rheometer (DSR) at a temperature no higher than about 30° C. and at a frequency of 10 rad/sec according to AASHTO M320 protocols. Such a temperature is much closer to the in-service conditions that the binder will be subjected to on the roadway than the temperatures chosen to evaluate binders under current SHRP testing. All shear modulus measurements throughout this application are at 10 rad/sec and measured on a RTFO-aged binder unless otherwise specified. FIG. 2 shows the strength of the correlation between the binder G* measurement made at 30° C. and the resilient modulus at 30° C. of a high modulus layer mixture made with the respective binder. By comparison to FIG. 1, it is clear that the correlation to binder G* at 30° C. is significantly better.

The binder selection process further includes measuring the creep stiffness of one or more proposed asphalt binders. Preferably, this is done using a Bending Beam Rheometer (BBR), according to AASHTO M320 and the Standard Test Method for Determining the Flexural Creep Stiffness of Asphalt Binder Using the Bending Beam Rheometer (BBR) (ASTM D6648). By selecting a binder with a desirable creep stiffness, the risk of pavement cracking due to thermal shrinkage stresses can be better protected against. Preferably, the bending creep stiffness of an RTFO-aged binder is measured at or near the lowest anticipated in-service pavement temperature for the depth at which it is placed. The preferred method for determining lowest temperature at a particular depth is to use the Long Term Pavement Performance (LTPP) Bind Software, Version 2.1, available from Federal Highway Administration (FHWA), which is familiar to those skilled in the art and to use a 50% reliability level or better. All complex shear modulus and creep stiffness measurements throughout this application are on RTFO-aged binders unless otherwise specified.

Still further, preferably, the high modulus layer binder selection process further includes measuring the ductility of one or more proposed binders. Also, preferably, the high modulus layer binder selection process includes calculating the thermal stress of one or more proposed binders. Most preferably, creep stiffness is measured in the BBR at two different temperatures. From the resulting data, which shows binder stiffness versus time, a software program can be used to calculate binder thermal stress as a function of temperature. Preferably, the software used is Thermal Stress Analysis Routine (TSAR) and is available from Abatech. From the calculated binder thermal stress versus temperature curve, a temperature can be estimated at which the binder will crack due to a lack of ability to relax thermally induced stresses in creep.

Figure 3:
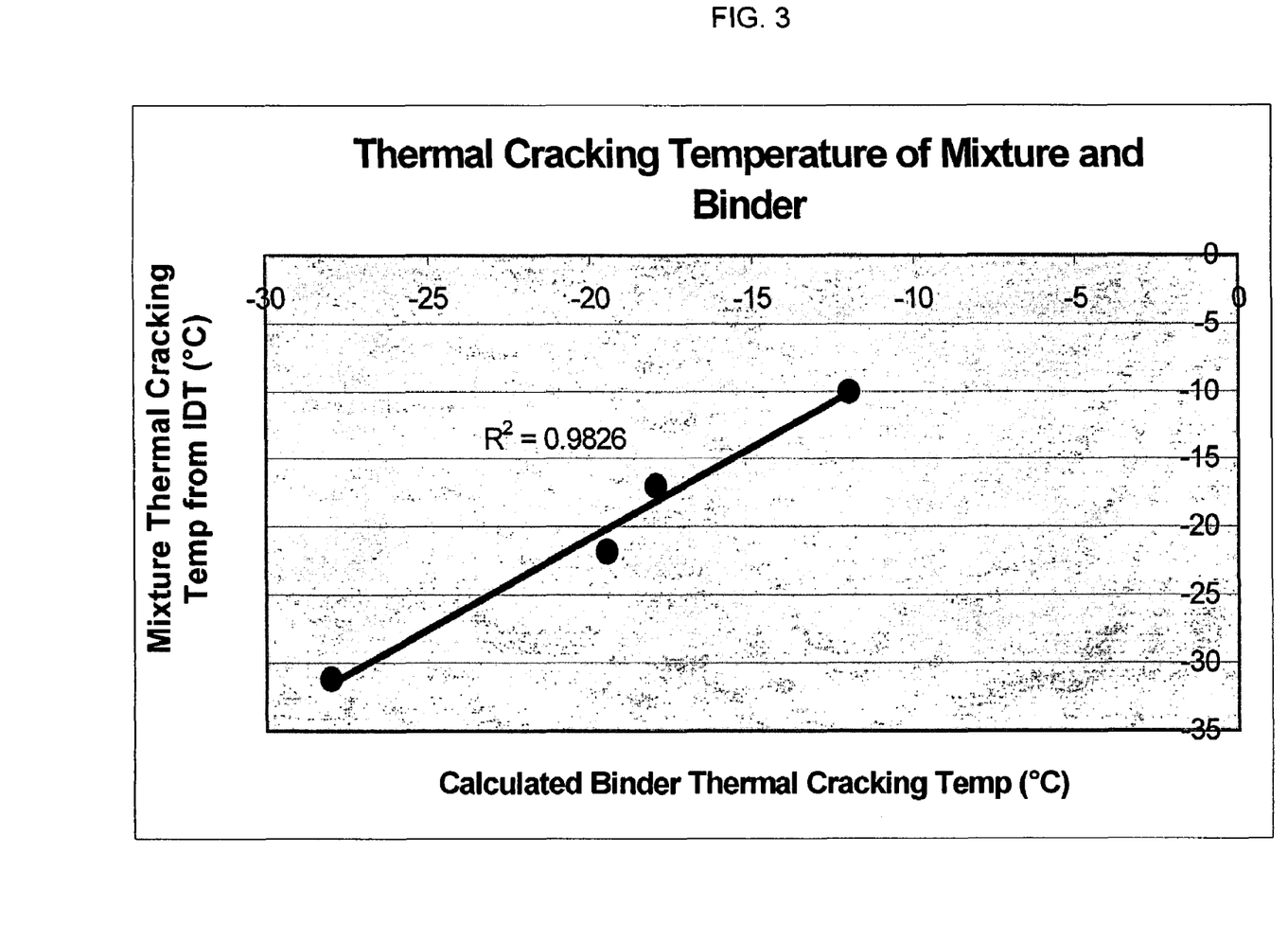
FIG. 3 is a graph showing mixture thermal cracking temperature from an IDT test versus calculated binder thermal cracking temperature.
Figure 4:
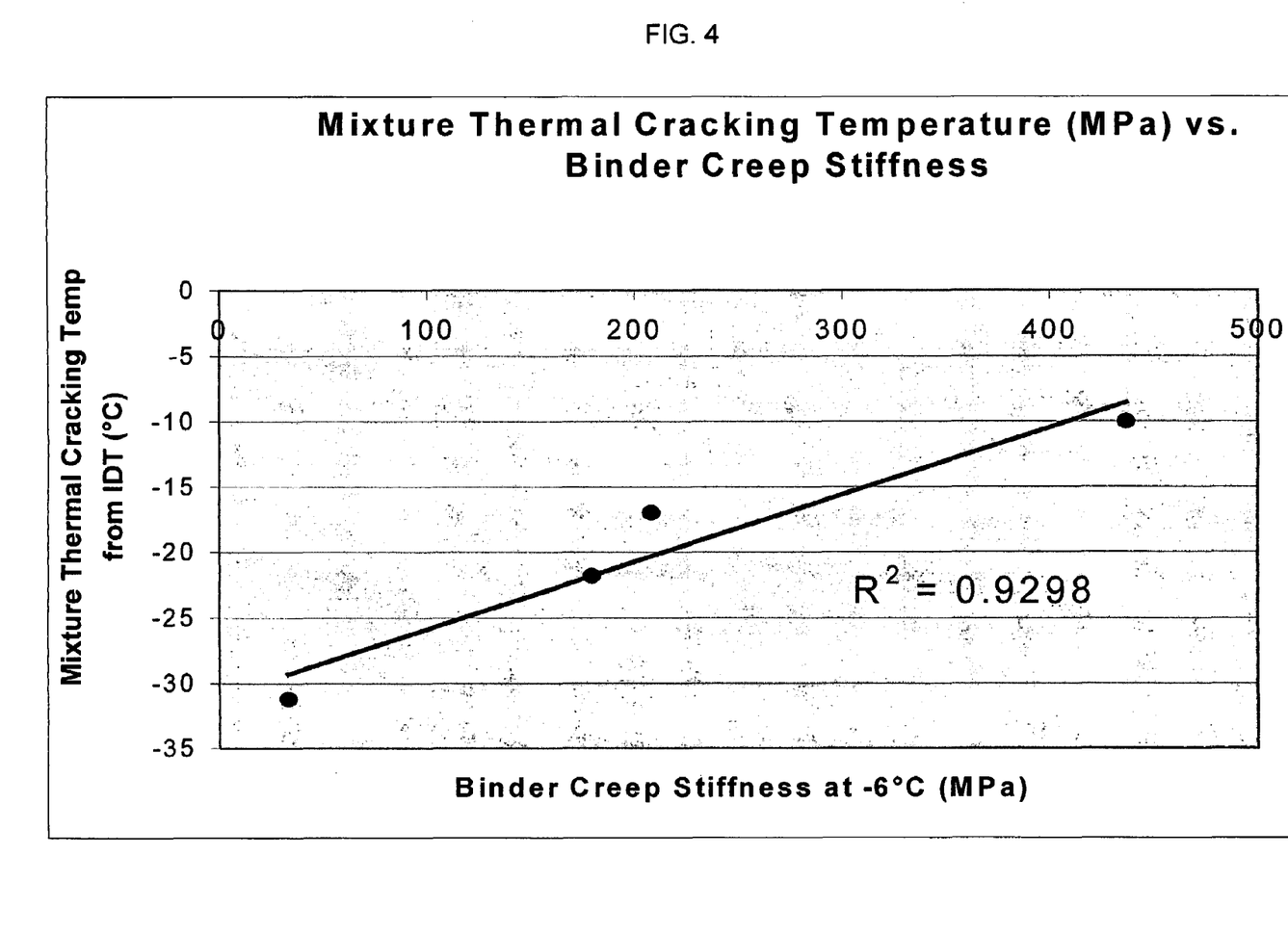
FIG. 4 is a graph showing mixture thermal cracking temperature from an IDT test versus binder creep stiffness.

FIG. 3 shows the correlation between the temperature at which the binder reaches a calculated binder thermal stress of 0.3 MPa and the actual failure temperature of the high modulus layer mix made with the same binder determined by an Indirect Tensile Test (IDT test). For purposes of analysis, a cooling rate of 2.0° C./hr is assumed for the binder and the mixture. FIG. 3 shows that the TSAR protocol performed on the binder adequately correlates to the cracking temperature of the mixture. FIG. 4 shows the correlation between the 60 second binder bending creep stiffness at −6° C. and the actual failure temperature of the mixture made from the respective binder determined by the IDT test. Notice that as the binder stiffness increases, the mixture fails at a warmer temperature due to thermal shrinkage stresses. By performing the test at −6° C., the binder is actually being evaluated for an in-service lowest temperature of −16° C. By reference to FIG. 4, it can be seen that keeping the binder creep stiffness below about 300 MPa is preferred, while keeping it lower than about 200 MPa gives more assurance against cracking due to thermal stresses down to −16° C.

A binder having a desirable G* and creep stiffness behavior is selected as the binder for the high modulus layer of the pavement. Preferably, the selected binder also displays desirable thermal stress and ductility characteristics. Multiple proposed asphalt binders may be tested before selecting a desired binder. Preferably, the selected binder has a complex shear modulus of at least about 2 MPa at 30° C. Most preferably, the selected binder has a complex shear modulus of at least about 4 MPa at 30° C. Preferably, the selected binder has a maximum bending creep stiffness of approximately 300 MPa at 60 seconds loading time at a temperature approximately 10° C. warmer than the anticipated coldest in-service temperature for the depth at which it is constructed. More preferably, the selected binder has a bending creep stiffness of no more than about 250 MPa under the same testing conditions. Most preferably, the selected binder has a bending creep stiffness of no more than about 200 MPa under the same testing conditions. Most preferably, the selected binder has a ductility of about 10 cm at 25° C. and 5 cm/min strain rate, as measured according to D113-86, Standard Test Method for Ductility of Bituminous Materials. Most preferably, the selected binder has a maximum calculated thermal stress of about 0.3 MPa at the lowest temperature corresponding to its depth of placement.

Figure 5:
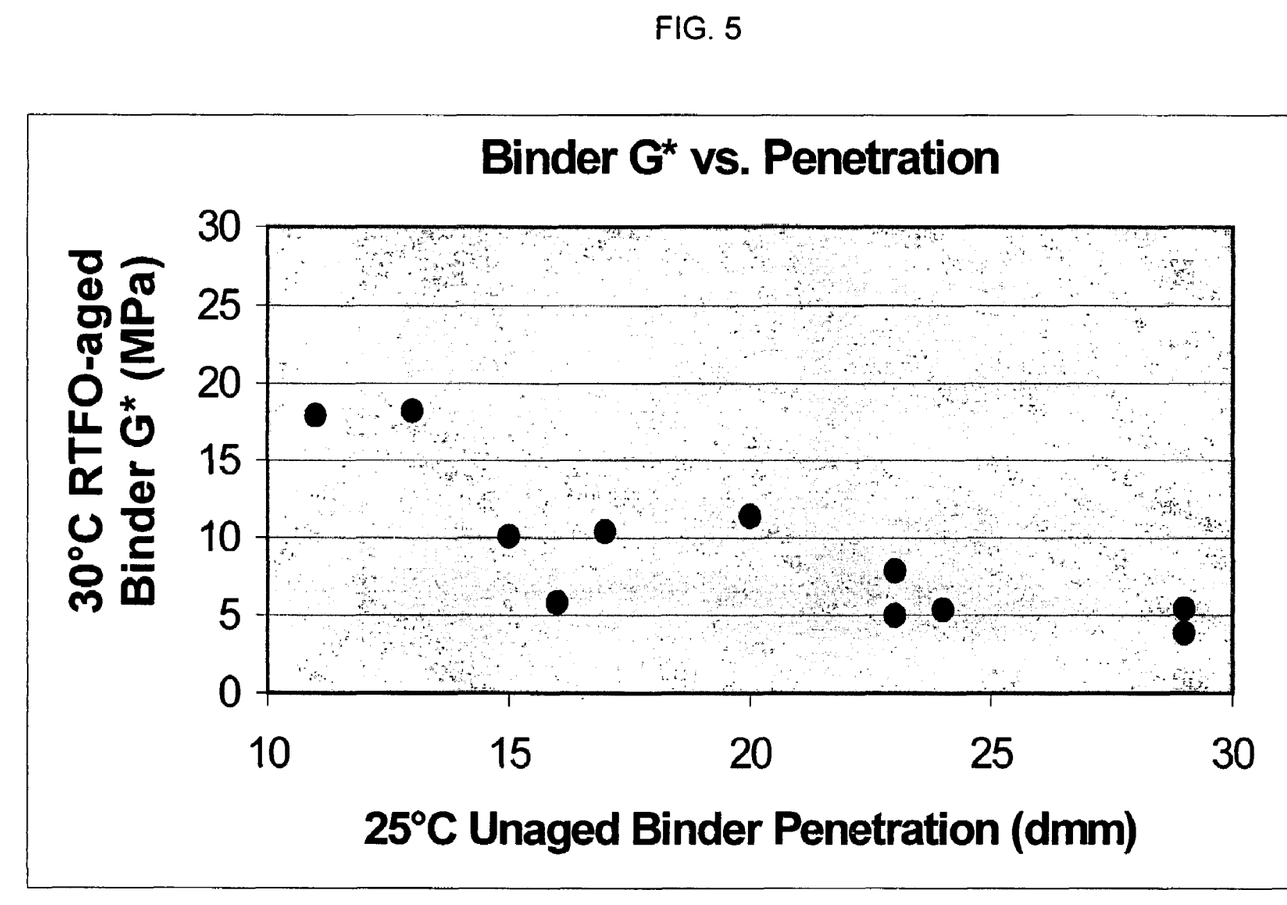
FIG. 5 is a graph showing the relationship between binder G* at 30° C. and binder penetration at 25° C.
Figure 6:
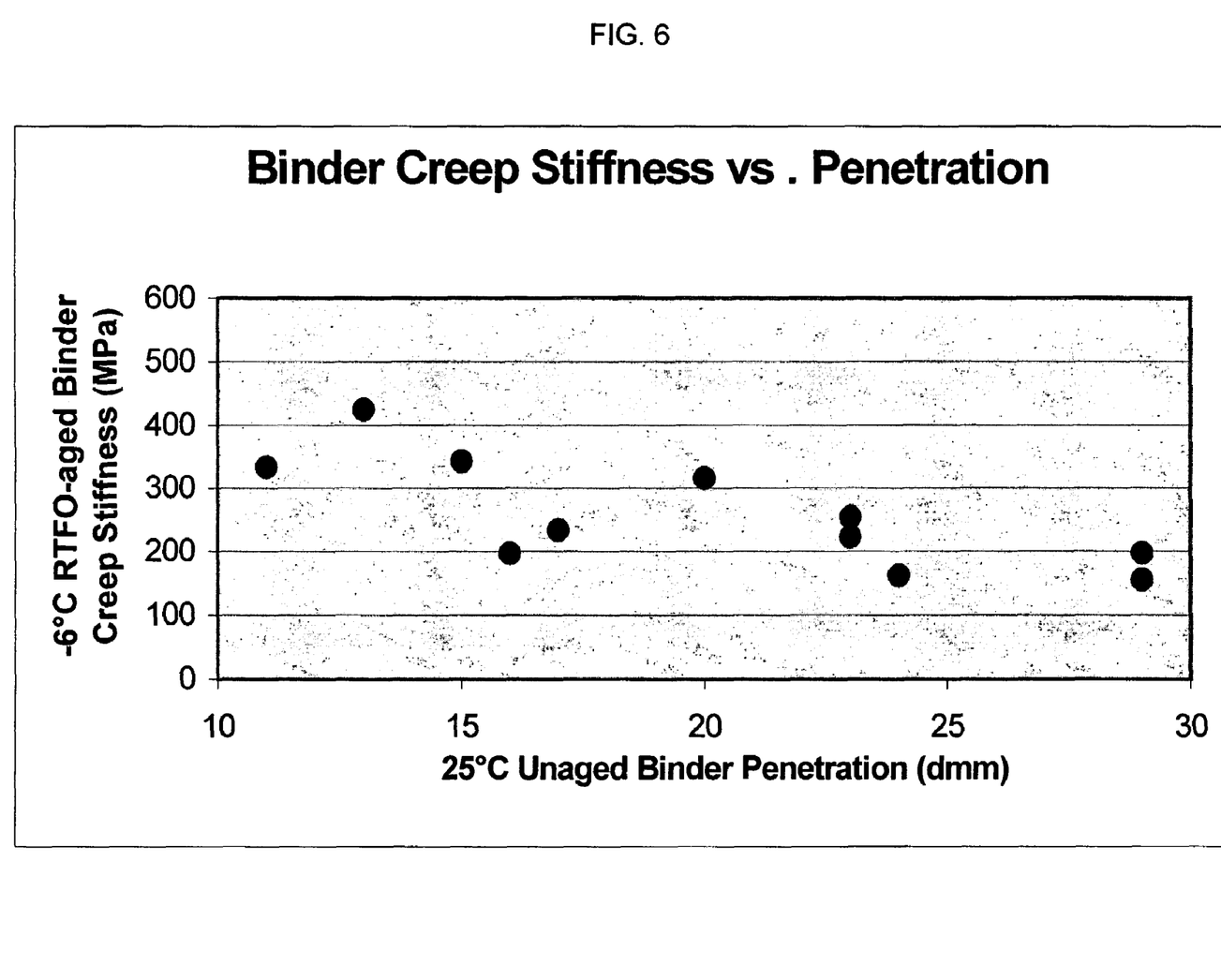
FIG. 6 is a graph showing the relationship between binder bending creep stiffness at −6° C. and binder penetration at 25° C.

FIGS. 5 and 6 demonstrate the shortcomings of the penetration measurement to adequately define the performance properties required of high modulus pavement layer binders. FIG. 5 shows that there is not a single mathematical function that defines the relationship between binder penetration at 25° C. and binder complex shear modulus (G*) at 30° C. Rather, there are multiple relationships indicated. Furthermore, FIG. 6 shows that there is no single mathematical function to define the relationship between binder penetration at 25° C. and the bending creep stiffness measured at 60 seconds loading time at −6C. In contrast, the method of the present invention separately accounts for both the intermediate and low temperature performance requirements of a binder (minimum stiffness to enhance load bearing capacity and maximum low temperature stiffness to resist cracking from thermal shrinkage stresses) with at least two binder tests that have been shown to better predict actual hot mix asphalt (HMA) mechanical properties.

Another aspect of the present invention is a method of formulating a binder for the high modulus layer of a pavement that meets the aforementioned performance attributes. Preferably, this is done by blending a very stiff asphalt binder with a very soft asphalt binder until a combination is developed that meets the desired performance attributes described above.

Preferably, the stiff asphalt binder is a bituminous material that may be referred to as "hard pen" by those of skill in the art. Hard pen is the result of the solvent stripping of the residual or bottoms from petroleum refining. Other terminology used to describe this very hard bitumen is propane asphalt, precipitated bitumens, propane deasphalted bottoms, or PDA. An asphalt from the straight-run distillation of crude oil also is an acceptable source of the stiff asphalt binder component of the formulation. An air-blown or oxidized asphalt also could be a source for the stiff component of the formulation, although such components many times are less desirable than a straight-run or hard pen bitumen. Preferably, the stiff asphalt binder is hard pen and has a penetration value of no more than about 50 dmm at 25° C. More preferably, the stiff asphalt binder has a penetration value of no more than about 25 dmm at 25° C. Most preferably, the stiff asphalt binder has a penetration value of no more than about 10 dmm at 25° C.

The soft asphalt binder is generally referred to as "flux" by those of ordinary skill in the art. It can include any direct-run or straight-run bitumen that has a significantly lower viscosity and higher penetration value compared with the stiff asphalt binder. Asphalts graded as PG 52-34 or PG 46-34, according to the SHRP methodology, can be used as the soft component of the binder formulation. Preferably, the soft component has a penetration value of at least about 200 dmm at 25° C. Most preferably, the soft component has a penetration value of at least about 300 dmm at 25° C.

Once a stiff asphalt binder and a soft asphalt binder have been selected, the two components are blended in the necessary proportions to meet the desired high and low temperature performance attributes described above. It is acceptable, but not necessary, that the blended components be further modified with polymer or any other modifiers commonly used by those skilled in the art.

In order to produce a binder with a minimal stiffness, making it useful for the high modulus layer of HMA pavement, preferably, the RTFO-aged binder G* measured at 30° C. should be at least about 2.0 MPa and more preferably, at least about 4.0 MPa. Preferably, the bending creep stiffness of the selected binder when measured at 60 seconds loading time and at a temperature about 10° C. warmer than the lowest anticipated in-service temperature at the depth of placement is no greater than about 300 MPa. Preferably, it is no more than about 250 MPa, and most preferably, it is no more than about 200 MPa.

The selected binder may be used to construct a high modulus layer of a pavement structure on rural roads, interstate highways, intrastate highways, toll roads, airfield pavements including but not limited to airport runways and taxiways, parking lots, port facilities and other asphalt paved areas that need construction or rehabilitation.

By selecting the binder according to the present invention, a layer having a high modulus can be created so that it can better distribute load than conventional layers. Further, this allows the overall thickness of the pavement structure to be reduced without sacrificing performance. In addition, a high modulus layer with increased structural capacity, good fatigue strength and good rutting resistance can be created by selecting and formulating a binder according to the present invention.

Examples of binder formulations made using the method of the present invention are shown in Table 1. These examples are not meant in any way to limit the scope of this invention. In each example, a stiff asphalt binder (stiff) and a soft asphalt binder (soft) were combined in the proportions indicated in Table 1 to create a binder. Examples 1 and 19 did not contain any soft asphalt binder and thus both are shown as containing 100% stiff asphalt binder. The percentages of stiff asphalt binder and soft asphalt binder that make up the binder are expressed in terms of percent by weight. The complex shear modulus (G*) of an RTFO-aged sample of each binder was measured at 30° C. In addition, the creep stiffness (S) of an RTFO-aged sample of each binder was measured at −6° C. Still further, the penetration of unaged samples of each binder was measured at 25° C. It is clear from reference to the examples that the combination of a stiff asphalt with a soft asphalt in the proper proportions can yield a binder with the desired properties for the high modulus layer of a pavement structure.

TABLE 1

Examples of Binder Formulations

| Example Number | Stiff | Soft | % Stiff | % Soft | RTFO 30° C. G* (MPa) | RTFO −6° C. S (MPa) | Unaged 25° C. Penetration (dmm) |
|---|---|---|---|---|---|---|---|
| 1 | A | n/a | 100 | 0 | 31.8 | 656 | 6 |
| 2 | A | X | 90 | 10 | 18.2 | 425 | 13 |
| 3 | A | X | 80 | 20 | 5.81 | 197 | 16 |
| 4 | A | X | 70 | 30 | 3.86 | 155 | 29 |
| 5 | B | W | 90 | 10 | 38.9 | 680 | 5 |
| 6 | B | W | 80 | 20 | 21.3 | 493 | 9 |
| 7 | B | W | 70 | 30 | 10.1 | 343 | 15 |
| 8 | B | W | 60 | 40 | 4.97 | 223 | 23 |
| 9 | B | W | 50 | 50 | 2.90 | 109 | 32 |
| 10 | C | Y | 90 | 10 | 28.0 | 422 | 8 |
| 11 | C | Y | 80 | 20 | 17.9 | 334 | 11 |
| 12 | C | Y | 70 | 30 | 10.4 | 234 | 17 |
| 13 | C | Y | 60 | 40 | 5.36 | 162 | 24 |
| 14 | C | Y | 50 | 50 | 2.61 | 87 | 35 |
| 15 | B | Z | 70 | 30 | 11.4 | 316 | 20 |
| 16 | B | Z | 65 | 35 | 7.83 | 255 | 23 |
| 17* | B | Z | 65 | 35 | 6.82 | 208 | 23 |
| 18 | B | Z | 60 | 40 | 5.41 | 197 | 29 |
| 19 | D | n/a | 100 | 0 | 5.50 | 66 | 15 |

*Contains 3% SB copolymer
Notes:
A = Calumet, LA Hard Pen;
B = Alon Big Springs, TX Hard Pen;
C = Cennex Laural, MT Hard Pen;
D = Oxidized Asphalt (200° F. Soft point);
W = Conoco-Phillips Wood River, IL Road Flux;
X = Calumet, LA Flux;
Y = Cennex Laural, MT 200-300 pen Flux;
Z = BP-Amoco PG 46-34 Flux As shown in Table 1, not any combination of a hard and soft asphalt will meet the desired high modulus layer binder performance requirements, namely a minimum complex shear modulus (G*) at 30° C. of about 2.0 MPa and a maximum bending creep stiffness at −6° C. of about 300 MPa.

Furthermore, the data in Table 1 demonstrates that penetration cannot be relied upon as a single measurement to meet both of these high and low temperature stiffness requirements for a binder used in a high modulus layer of an HMA pavement. For example, the binders in examples 7 and 3 have very similar penetration values (15 dmm vs. 16 dmm, respectively) yet the binder in example 7 has a bending creep stiffness at −6° C. that is too high to meet the stated performance requirements, whereas the binder in example 3 meets the desired requirements. Examples 16 and 8 have identical penetration values (23 dmm), yet the binder in example 16 has a G* value at 30° C. that is almost 60% greater than the G* value of the binder in example 8. This magnitude of difference in G* represents a significant difference in stiffness between the two binders that would be expected to impact the performance of the high modulus layer of an HMA pavement. Examples 1–19 illustrate the shortcomings of relying solely on penetration measurements and demonstrate the superiority of the selection and formulation methods of the present invention.

Example 19 in Table 1 shows that a properly airblown or oxidized asphalt can meet the requirements stated herein for use as a high modulus layer binder.

Example 17 demonstrates the impact polymer modification has on binder properties. The only difference between the binders in examples 16 and 17 is that the binder in example 17 contains 3% by mass of a styrene-butadiene copolymer. The effect of adding the polymer is to soften the binder at 30° C. yielding a slightly lower value of G* and at −6° C. yielding a somewhat more significant drop in the binder bending creep stiffness. The impact might be considered beneficial if it were necessary to improve the binder's ability to resist cracking from thermal shrinkage stresses without sacrificing the ability to provide adequate stiffness in the resultant HMA high modulus layer mixture. Interestingly, the binders in both examples 16 and 17 have the same penetration values, again demonstrating that penetration measurements alone cannot be relied upon to adequately predict the performance of a binder for use as a high modulus layer binder.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, is to be understood that all matters herein set forth or shown in the accompanying figures are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

We claim:

1. A method of selecting an asphalt binder for use in constructing a high modulus layer of asphalt pavement, comprising:
   providing at least one proposed asphalt binder;
   measuring complex shear modulus of said proposed binder at a temperature of not more than about 30° C.;
   measuring creep stiffness of said proposed binder at a temperature near the lowest in-service temperature of said layer; and
   selecting an asphalt binder for said high modulus layer using said complex shear modulus and creep stiffness measurements.

2. The method of claim 1, further comprising:
   calculating thermal stress of said proposed binder from said creep stiffness measurements before selecting said asphalt binder for said high modulus layer.

3. The method of claim 1 wherein said selected binder is comprised of a mixture of a stiff asphalt binder and a soft asphalt binder.

4. The method of claim 3 wherein said stiff asphalt binder has a penetration value of no more than about 50 dmm when measured at 25° C.

5. The method of claim 4 wherein said soft asphalt binder has a penetration value of at least about 200 dmm when measured at 25° C.

6. The method of claim 3 wherein said stiff asphalt binder is comprised of bituminous bottoms.

7. The method of claim 6 wherein said soft asphalt binder is comprised of flux.

8. The method of claim 1, wherein said proposed asphalt binder is Rolling Thin Film Oven (RTFO) aged prior to said measuring steps.

9. The method of claim 1 wherein said complex shear modulus is measured at a temperature of at least about 10° C.

10. The method of claim 1 wherein said selected binder is comprised of asphalt and polymer.

11. The method of claim 1 wherein said selected binder has a complex shear modulus of at least about 2 MPa at 30° C. and 10 rad/sec.

12. The method of claim 11 wherein said selected binder has a creep stiffness of no more than about 300 MPa when measured at about 10° C. above said lowest in-service temperature of said layer and 60 seconds loading time.

13. The method of claim 12 wherein said selected binder has a maximum calculated thermal stress of about 0.3 MPa at approximately the lowest in-service temperature at the depth at which the layer is placed and a minimum ductility of about 10 cm at 25° C. and 5 cm/min strain rate.

14. The method of claim 11 wherein said selected binder has a creep stiffness of no more than about 250 MPa when measured at about 10° C. above said lowest in-service temperature of said layer and 60 seconds loading time.

15. The method of claim 11 wherein said selected binder has a creep stiffness of no more than about 200 MPa when measured at about 10° C. above said lowest in-service temperature of said layer and 60 seconds loading time.

16. The method of claim 1 wherein said selected binder has a complex shear modulus of at least about 4 MPa at 30° C. and 10 rad/sec.

17. The method of claim 1, further comprising:
measuring ductility of said proposed binder before selecting said asphalt binder for said high modulus layer.

18. The method of claim 1 wherein said proposed binder is said selected binder.

19. A method of formulating an asphalt binder for a high modulus layer of pavement, comprising:
providing a stiff asphalt binder;
providing a soft asphalt binder; and
mixing said stiff asphalt binder and said soft asphalt binder together to form a binder having a complex shear modulus of at least about 2 MPa at 30° C. and 10 rad/sec and a creep stiffness of no more than about 300 MPa when measured at about 10° C. above the lowest in-service temperature of said layer and 60 seconds loading time.

20. The method of claim 19 wherein said stiff asphalt binder is comprised of bituminous bottoms.

21. The method of claim 19 wherein said soft asphalt binder is comprised of flux.

22. The method of claim 19 wherein said stiff asphalt binder has a penetration value no greater than about 50 dmm at 25° C.

23. The method of claim 19 wherein said stiff asphalt binder has a penetration value no greater than about 25 dmm at 25° C.

24. The method of claim 19 wherein said stiff asphalt binder has a penetration value no greater than about 10 dmm at 25° C.

25. The method of claim 19 wherein said soft asphalt binder has a penetration value of at least about 200 dmm at 25° C.

26. The method of claim 19 wherein said soft asphalt binder has a penetration value of at least about 300 dmm at 25° C.

27. The method of claim 19, further comprising:
mixing a polymer with said stiff asphalt binder and said soft asphalt binder.

28. The method of claim 19 wherein said binder has a complex shear modulus of at least about 4 MPa at 30° C. and 10 rad/sec.

29. The method of claim 19 wherein said binder has a creep stiffness of no more than about 250 MPa at a temperature about 10° C. above the lowest in-service layer temperature and at 60 seconds loading time.

30. The method of claim 19 wherein said binder has a creep stiffness of no more than about 200 MPa at a temperature about 10° C. above the lowest in-service layer temperature and at 60 seconds loading time.

31. The method of claim 19, wherein said binder has a complex shear modulus of at least about 2 MPa at 30° C. and 10 rad/sec and a creep stiffness of no more than about 300 MPa at a temperature about 10° C. above the lowest in-service layer temperature and at 60 seconds loading time when said binder is Rolling Thin Film Oven (RTFO) aged.

* * * * *